US010752770B2

(12) United States Patent
Chen et al.

(10) Patent No.: US 10,752,770 B2
(45) Date of Patent: Aug. 25, 2020

(54) ADHESIVE FORMULATIONS FOR FABRIC/POE ADHESION

(71) Applicant: Dow Global Technologies LLC, Midland, MI (US)

(72) Inventors: Yongchun Chen, Shanghai (CN); Hang Wu, Shanghai (CN); Haiyang Yu, Shanghai (CN); Weiming Ma, Shanghai (CN); Hong Yang, Shanghai (CN); Xiao Yi Pang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 127 days.

(21) Appl. No.: 15/777,825

(22) PCT Filed: Nov. 23, 2016

(86) PCT No.: PCT/US2016/063499
§ 371 (c)(1),
(2) Date: May 21, 2018

(87) PCT Pub. No.: WO2017/091671
PCT Pub. Date: Jun. 1, 2017

(65) Prior Publication Data
US 2018/0346707 A1 Dec. 6, 2018

(30) Foreign Application Priority Data

Nov. 27, 2015 (WO) ................ PCT/CN2015/095762

(51) Int. Cl.
B23B 27/00 (2006.01)
C09J 123/26 (2006.01)
C09J 151/06 (2006.01)
C08L 53/00 (2006.01)
B32B 27/32 (2006.01)
B32B 5/02 (2006.01)
C09J 153/02 (2006.01)
C08K 5/20 (2006.01)
C08L 53/02 (2006.01)
B32B 27/20 (2006.01)
B32B 7/12 (2006.01)
B32B 27/12 (2006.01)
B32B 27/30 (2006.01)
C08F 222/08 (2006.01)
C08L 23/26 (2006.01)
C09J 151/00 (2006.01)
(Continued)

(52) U.S. Cl.
CPC ............. *C08L 53/005* (2013.01); *B32B 5/02* (2013.01); *B32B 5/022* (2013.01); *B32B 5/024* (2013.01); *B32B 7/12* (2013.01); *B32B 27/12* (2013.01); *B32B 27/20* (2013.01); *B32B 27/302* (2013.01); *B32B 27/32* (2013.01); *C08F 222/08* (2013.01); *C08K 5/20* (2013.01); *C08L 23/26* (2013.01); *C08L 53/025* (2013.01); *C09J 123/26* (2013.01); *C09J 151/003* (2013.01); *C09J 151/06* (2013.01); *C09J 153/005* (2013.01); *C09J 153/025* (2013.01); *B32B 2250/02* (2013.01); *B32B 2260/021* (2013.01); *B32B 2262/0215* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/062* (2013.01); *B32B 2262/08* (2013.01); *B32B 2262/14* (2013.01); *B32B 2264/102* (2013.01); *B32B 2264/104* (2013.01); *B32B 2307/748* (2013.01); *B32B 2433/02* (2013.01); *B32B 2439/46* (2013.01); *B32B 2439/60* (2013.01); *B32B 2439/70* (2013.01); *B32B 2597/00* (2013.01); *C08L 77/00* (2013.01)

(58) Field of Classification Search
CPC ........ C08L 23/26; C08L 23/28; C08L 53/005; C08L 53/025; C09J 123/26; C09J 127/24; C09J 153/005; C09J 153/025; C09J 123/12; C09J 151/06; C09J 153/02; B32B 27/32; B32B 27/322
See application file for complete search history.

(56) References Cited

U.S. PATENT DOCUMENTS 4,789,699 A 12/1988 Kieffer et al.
5,093,422 A 3/1992 Himes et al.
(Continued)

FOREIGN PATENT DOCUMENTS

CN 102719195 A * 10/2012 ........... C09D 109/06
CN 103342933 A * 10/2013 ........... C09D 133/00
(Continued)

OTHER PUBLICATIONS

CN 102719195 A (Oct. 9, 2013); machine translation. (Year: 2013).*
(Continued)

Primary Examiner — Rip A Lee
(74) Attorney, Agent, or Firm — Quarles & Brady LLP

(57) ABSTRACT

Embodiments of this invention relate to a composition comprising of (A) an anhydride and/or carboxylic acid functionalized, chlorinated olefin-based polymer and/or (b) a styrene-based polymer and/or a functionalized styrene-based polymer, (B) a polyamide wax slurry, and (C) organic solvent, and which composition can be used as an adhesive to bond a fabric to a polyolefin elastomer (POE) thermoplastic sheet, articles made from the composition, and methods of producing the composition and articles.

20 Claims, No Drawings

(51) Int. Cl.
*C09J 153/00* (2006.01)
*C08L 77/00* (2006.01)

(56) References Cited

U.S. PATENT DOCUMENTS

| | | | |
|---|---|---|---|
| 5,135,984 A * | 8/1992 | Kinosada | C08F 299/00 |
| | | | 525/192 |
| 5,166,229 A | 11/1992 | Nakano et al. | |
| 5,332,613 A | 7/1994 | Taylor et al. | |
| 5,492,963 A | 2/1996 | Ozawa et al. | |
| 6,048,610 A | 4/2000 | St. Coeur et al. | |
| 6,525,157 B2 | 2/2003 | Cozewith et al. | |
| 6,582,829 B1 | 6/2003 | Quinn et al. | |
| 6,960,635 B2 | 11/2005 | Stevens et al. | |
| 7,763,692 B2 | 7/2010 | Tamai et al. | |
| 8,193,273 B2 | 6/2012 | Page et al. | |
| 8,450,430 B2 | 5/2013 | Silvis et al. | |
| 10,618,259 B2 * | 4/2020 | Yu | B32B 5/022 |
| 2003/0152767 A1 | 8/2003 | Hawkins et al. | |
| 2004/0087235 A1 | 5/2004 | Morman et al. | |
| 2004/0122408 A1 | 6/2004 | Potnis et al. | |
| 2004/0122409 A1 | 6/2004 | Thomas et al. | |
| 2006/0074181 A1 * | 4/2006 | Eagan | C09D 167/00 |
| | | | 524/599 |
| 2009/0028607 A1 | 1/2009 | Hamasaki et al. | |
| 2012/0108134 A1 | 5/2012 | Chee et al. | |
| 2014/0315037 A1 | 10/2014 | Daniel | |

FOREIGN PATENT DOCUMENTS

| | | | | |
|---|---|---|---|---|
| CN | 103342933 A | | 10/2013 | |
| CN | 103724915 A | * | 4/2014 | ............ C08K 13/02 |
| CN | 103724915 A | | 4/2014 | |
| CN | 103724917 A | | 4/2014 | |
| CN | 103788560 A | | 5/2014 | |
| EP | 0712892 B1 | | 3/2002 | |
| FR | 2218206 A1 | | 9/1974 | |
| JP | H0733843 A | | 2/1995 | |
| JP | 3023188 B2 | | 3/2000 | |
| JP | 2008260903 A | | 10/2008 | |
| WO | WO-2015188358 A1 | * | 12/2015 | ............ C08L 23/26 |
| WO | WO-2015188763 A1 | * | 12/2015 | ............ C08L 23/26 |

OTHER PUBLICATIONS

CN 103724915 A (Apr. 16, 2014); machine translation. (Year: 2014).*

* cited by examiner

ADHESIVE FORMULATIONS FOR FABRIC/POE ADHESION

REFERENCE TO RELATED APPLICATIONS

This application is claims priority to PCT/CN2015/095762, filed Nov. 27, 2015.

BACKGROUND OF THE INVENTION

Coated fabric is widely used in sporting goods such as backpacks and tents and outer wear such as artificial leather, and is typically formed by laminating polyethylene terephthalate (PET) or polyamide (PA) nylon fabrics with a thermoplastic sheet using suitable adhesives. Currently, the most widely used thermoplastic sheets for such applications include those prepared from polyvinyl chloride (PVC), polyurethane (PU) or styrene block copolymers such as styrene-butadiene-styrene (SBS) or styrene-ethylene-butylene-styrene (SEBS) copolymers. However, PVC is not considered environmentally benign, while styrene block copolymers (SBS) have poor weatherability. PU and SEBS have acceptable weatherability but the high cost limits their application.

More environmentally benign and stable polymeric alternatives include polyolefin elastomer (POE) thermoplastic sheets. However, the less polar nature of polyolefin elastomers makes it difficult to laminate those materials to fabric substrates.

Current adhesive solutions used to bond fabric to POE sheets have several drawbacks. One drawback is the use of toxic solvents such as toluene or xylene in the adhesive formulations. Another drawback is the use of isocyanate crosslinkers, which are expensive and require a complex process to produce the adhesive solution, and do not provide a bonding strength of the adhesive that is sufficiently robust to meet customers' needs.

Therefore, there is a need for a system that combines weatherability, environmentally friendliness, cost effectiveness, high stability, workability and ease of application of the adhesive component by a variety of processes, and high adhesive bonding strength.

SUMMARY OF THE INVENTION

Embodiments of the invention include a composition, a coated substrate, and articles made therefrom.
A composition comprising at least the following:
A) at least one polymer selected from the following:
i) an anhydride and/or carboxylic acid functionalized, chlorinated olefin-based polymer; or
ii) a styrene-based polymer or a functionalized styrene-based polymer; or
iii) a combination of i) and ii);
B) a polyamide wax slurry; and
C) an organic solvent.
A composition comprising at least the following:
A) at least one polymer selected from the following:
i) an anhydride and/or carboxylic acid functionalized, chlorinated olefin-based polymer; or
ii) a styrene-based polymer or a functionalized styrene-based polymer; or
iii) a combination of i) and ii);
B) a plasticizer; and
C) an organic solvent.
In an embodiment, the composition comprises, the wt % based on the total weight of the composition:

A) 0.5 to 40 wt % of the at least one polymer;
B) 0.5 to 40 wt % of the polyamide wax slurry; and
C) 20 to 99, or 40 to 99, or 60 to 99, wt % of the organic solvent;
each wt % based on the total weight of the composition.
In an embodiment, the composition further comprises a tackifier.
In an embodiment, the composition comprises, the wt % based on the total weight of the composition:
A) 0.5 to 40 wt % of the at least one polymer;
B) 0.5 to 40 wt % of the plasticizer; and
C) 20 to 99, or 40 to 99, or 60 to 99, wt % of the organic solvent;
each wt % based on the total weight of the composition.
In an embodiment, the composition further comprises a tackifier In an embodiment, the invention provides a coated substrate comprising the composition. In an embodiment the coated substrate comprises:
a) a fabric substrate layer;
b) an adhesive layer which is formed from a composition as disclosed herein; and
c) an olefin-based layer formed from a second composition comprising at least one olefin-based polymer.
In an embodiment, the fabric substrate layer and olefin-based layer are bonded by the adhesive layer to form the coated substrate.

In an embodiment, the invention provides an adhesive composition comprising a composition as described herein.
In another embodiment, the invention provides an article comprising at least one component formed from the composition as disclosed herein. In an embodiment, the article is composed of a coated substrate.

In an embodiment, the article is composed of at least one component formed from a coated substrate comprising the composition as disclosed herein.

DETAILED DESCRIPTION OF THE INVENTION

Various embodiments of the present invention relate to a composition comprising at least (A) at least one polymer selected from i) an anhydride and/or carboxylic acid functionalized, chlorinated olefin-based polymer, or ii) a styrene-based polymer and/or a functionalized styrene-based polymer, or iii) a combination thereof; B) a polyamide wax slurry or a plasticizer, and C) an organic solvent. In an embodiment, the composition further comprises a tackifier. Additionally, certain embodiments concern an adhesive composition, a coated substrate, and articles of manufacture employing the compositions and coated substrates as described herein.

Polymer Component (A)/Anhydride and/or Carboxylic Acid Functionalized, Chlorinated Olefin-Based Polymer In an embodiment, the polymer component (A) is an anhydride and/or carboxylic acid functionalized, chlorinated olefin-based polymer.

As used herein, the term "anhydride and/or carboxylic acid functionalized, chlorinated olefin-based polymer" refers to a chlorinated olefin-based polymer into, or onto, which maleic anhydride and/or carboxylic acid functional groups are grafted onto the olefin based polymer, or an olefin-based polymer comprising one or more chlorine containing comonomers and which is later functionalized with maleic anhydride and/or carboxylic acid functional groups. Grafting reactions are described, for example, in U.S. Pat. No. 8,450,430 and U.S. Pat. No. 7,763,692. Alternatively, the functional group may be present in a copolymer (i.e., carboxylic acid functional group) which is copolymerized with the olefin monomers to form the olefin-based polymer.

In one embodiment, the polymer component (A) is an anhydride and/or carboxylic acid functionalized, chlorinated olefin-based polymer formed from a chlorinated olefin-based polymer onto, which maleic anhydride and/or carboxylic acid functional groups is grafted onto, the olefin based polymer.

In one embodiment the polymer (A) component is an anhydride and/or carboxylic acid functionalized, chlorinated olefin-based polymer that has a chlorine content from 0.05 to 16 wt %, based on the total weight of the composition. All individual values and subranges from 0.05 to 16 wt % chlorine are included and disclosed herein; for example, the chlorine content can be from a lower limit of 0.05, or 0.1, or 0.5, or 1, or 2, or 5, or 8, wt %, to an upper limit of 8, or 10, or 12, or 14, or 16, wt %. For example, in embodiments, the chlorine content can be from 0.05 to 16 wt %, or from 0.5 to 15 wt %, or from 1 to 10 wt %.

In one embodiment, the polymer component (A) is an anhydride and/or carboxylic acid functionalized, chlorinated olefin-based polymer that has a chlorine content from 10 to 40 wt %, or from 15 to 30 wt %, based on the total weight of the anhydride and/or carboxylic acid functionalized, chlorinated olefin-based polymer. All individual values and subranges from 10 to 40 wt % chlorine are included and disclosed herein; for example, the chlorine content can be from a lower limit of 10, or 14, or 16, or 18, or 20, or 22, or 26, or 30, wt % to an upper limit of 12, or 16, or 20, or 24, or 28, or 30, or 35, or 40, wt %. For example, in embodiments, the chlorine content can be from 10 to 40 wt %, or from 10 to 20 wt %, or from 20 to 35 wt %, or from 18 to 32 wt %, or from 15 to 30 wt %.

In one embodiment, a preferred embodiment, the anhydride and/or carboxylic acid functionalized, chlorinated olefin-based polymer is a maleic anhydride grafted chlorinated olefin-based polymer (MAH-g-CPO). In one embodiment, the anhydride and/or carboxylic acid functionalized, chlorinated olefin-based polymer is a maleic anhydride grafted chlorinated olefin-based polymer having a maleic anhydride content of from 0.75 to 3 wt %, based on the weight of the anhydride functionalized, chlorinated olefin-based polymer. All individual values and subranges from 0.75 to 3 wt % are included and disclosed herein; for example, the maleic anhydride level can be from a lower limit of 0.75, or 1, or 1.5, or 2, or 2.5, or 2.75, wt % to an upper limit of 0.9, or 1.35, or 1.8, or 2.25, or 2.8, or 3, wt %. For example, in embodiments, the maleic anhydride level can be from 0.75 to 3 wt %, or from 0.75 to 1.75 wt %, or from 1.75 to 3 wt %, or from 1 to 2 wt %.

In one embodiment, the anhydride and/or carboxylic acid functionalized, chlorinated olefin-based polymer is a maleic anhydride grafted chlorinated olefin-based polymer having a weight average molecular weight, Mw, from 25,000 to 125,000 g/mole. All individual values and subranges from 25,000 to 125,000 are included and disclosed herein; for example, the Mw can be from a lower limit of 25,000, or 50,000, or 75,000, or 100,000, g/mole, to an upper limit of 50,000, or 75,000, or 100,000, or 125,000, g/mole. For example, in embodiments, the Mw can be from 25,000 to 125,000, or from 25,000 to 75,000, or from 75,000 to 125,000, or from 50,000 to 100,000, g/mole.

In one embodiment, a preferred embodiment, the chlorinated olefin-based polymer is a chlorinated propylene-based polymer. Examples of chlorinated propylene-based polymers include those prepared from polypropylene and copolymers comprising propylene and at least one ethylenically unsaturated monomer selected from the group consisting of $C_2$-$C_{10}$ α-olefins. Examples of $C_2$-$C_{10}$ α-olefins include ethylene (considered an α-olefin for purposes of this invention), 1-butene, 3-methyl-1-pentene, 1-pentene, 1-hexene, 1-heptene and 1-octene. The copolymers may be dipolymers, terpolymers, or higher order copolymers.

In one embodiment, the polymer component (A) is a chlorinated olefin-based graft copolymer. In a preferred embodiment, the polymer component (A) is a chlorinated propylene-based polymer (e.g., a propylene/ethylene interpolymer) grafted (functionalized) with maleic anhydride.

In one embodiment, the composition comprises ≥80 wt %, or ≥85 wt %, or ≥90 wt %, or ≥95 wt %, or ≥98 wt %, or ≥99 wt % of the sum weight of components A, B and C, based on the weight of the composition.

Polymer Component (A)/Styrene-Based Polymer or a Functionalized Styrene-Based Polymer In an embodiment, the polymer component (A) comprises a styrene-based polymer, a functionalized styrene-based polymer, or a mixture thereof. In one embodiment, the polymer component (A) comprises a styrene block copolymer (SBC). Nonlimiting examples of styrene block copolymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), styrene-ethylene butadiene/styrene-styrene (S-EB/S-S) block copolymers, enhanced rubber segment (ERS) styrene-ethylene/butylene-styrene block copolymers (SEBS), a functionalized styrene-based block copolymer (SBC), and mixtures thereof. In an embodiment, the component A polymer comprises a styrene-based polymer selected from the group consisting of styrene block copolymers (SBCs), enhanced rubber segment (ERS) styrene block copolymers (ERS-SBC), and mixtures thereof. Examples of styrene block copolymers suitable for the invention are described in the following issued patents and patent application publications: EP0712892, WO2004/041538, U.S. Pat. No. 6,582,829, US 2004/0087235, US 004/0122408, US 2004/0122409, and U.S. Pat. No. 4,789, 699, U.S. Pat. No. 5,093,422 and U.S. Pat. No. 5,332,613. Styrene block copolymers are available, for example, from Kraton Corp., Houston, Tex., under the trademark KRATON® (e.g., KRATON® G1652, KRATON® G1643, KRATON® FG1901), from Dexco Polymers under the trademark VECTOR®, and from Dynasol under the trademark SOLPRENE®.

In one embodiment, the polymer component (A) comprises a styrene ethylene butene styrene (SEBS) block copolymer with an average styrene content of equal to or less than 60%. In one embodiment, the polymer component (A) comprises a styrene block copolymer with an average styrene content of 10 to 60 wt %, or 15 to 40 wt %.

In general, hydrogenated styrene block copolymers suitable for the invention have at least two mono-alkenyl arene blocks, preferably two polystyrene blocks, separated by a block of saturated conjugated diene comprising less than 20% residual ethylenic unsaturation, preferably a saturated polybutadiene block. The preferred styrene block copolymers have a linear structure although in some embodiments, branched or radial polymers or functionalized block copolymers make useful compounds.

Typically, polystyrene-saturated polybutadiene-polystyrene and polystyrene-saturated polyisoprene-polystyrene block copolymers comprise polystyrene end-blocks having a number average molecular weight from 5,000 to 35,000 and saturated polybutadiene or saturated polyisoprene mid-blocks having a number average molecular weight from 20,000 to 170,000. The total number average molecular weight of the styrene block copolymer is preferably from 30,000 to 250,000 if the copolymer has a linear structure.

In one embodiment, the styrene block copolymer has a melt index (MI) of at least 3, or 5, or 10, or 15, up to 50, or 45, or 40, or 35, gm/10 min. (ASTM D1238; 230° C., 5 Kg).

In one embodiment, the styrene block copolymer is an enhanced rubber segment (ERS) styrene block copolymer (ERS-SBC). In one embodiment, the styrene block copolymer is an enhanced rubber segment styrene/ethylene/butylene/styrene (ERS-SEBS). ERS-SEBS are available, for example, from Kraton Corp., Houston, Tex., under the trademark KRATON® (e.g., KRATON® G1643, G 1641, G1642). In one embodiment, the ERS styrene block copolymer (ERS-SBC) has equal to or greater than 0.5, or 0.7, or 1, up to 2, or 1.5, wt % MAH grafted onto the styrene block copolymer. In one embodiment, the styrene content of the ERS-SBC is 5 to 25, or 10 to 20, wt %. In one embodiment, the melt index (MI) of the ERS-SBC is 1 to 30, or 15 to 20, gm/10 min. (ASTM D1238; 230° C., 5 Kg).

In one embodiment, the polymer component (A) is a functionalized styrene-based block copolymer (SBC) comprising a functional group. Examples of suitable functional groups include anhydrides, carboxylates, carboxyls (—COOH), amines, hydroxyls (OH), carbonyl, acrylate, or combinations thereof. The functional group can be grafted pendant to the polymer chain. Alternatively, the functional group can be present in a copolymer (e.g., acid anhydride) which is copolymerized with the styrene monomers to form the functionalized styrene-based polymer.

In an embodiment, carboxyl groups are grafted onto a preformed styrene block copolymer. In another embodiment, acid anhydride groups are grafted onto a preformed styrene block copolymer. Nonlimiting examples of unsaturated carboxylic acid and acid anhydride compounds that can be grafted onto the preformed styrene block copolymer include maleic acid, fumaric acid, itaconic acid, acrylic acid, methacrylic acid, crotonic acid, maleic anhydride, and itaconic anhydride.

In an embodiment, the functionalized styrene block copolymer is selected from anhydride-functionalized styrene block copolymer, carboxylic-acid-functionalized styrene block copolymer, hydroxy-functionalized styrene block copolymer, amine-functionalized styrene block copolymer and combinations thereof. In an embodiment, the functionalized styrene block copolymer is a maleic anhydride-functionalized styrene block copolymer.

In one embodiment, the functionalized styrene block copolymer contains at least 10, or 20, or 25, or 30, or 35, or 40, and less than 60, or 55, or 50, or 45, wt %, polymerized styrene, based on the weight of the functionalized styrene block polymer. In one embodiment the functionalized styrene block copolymer contains 25 to 35 wt % polymerized styrene, based on the weight of the functionalized styrene block copolymer.

In one embodiment, the functionalized styrene block copolymer contains from greater than 0, or at least 0.5, or at least 1, wt %, and less than or equal to 5, or 4.5, or 4, or 3.5, or 3, or 2.5, or 2, or 1.5, wt %, of the functional group, based on the weight of the functionalized styrene block copolymer. In one embodiment, the functionalized styrene block copolymer contains from 1 to 2 wt % of the functional group, based on the weight of the functionalized styrene block copolymer.

In one embodiment, the polymer component (A) is a maleic anhydride (MAH) grafted SBC polymer. In one embodiment, the functionalized styrene block copolymer is a maleic anhydride grafted styrene/ethylene butylene/styrene copolymer (MAH-g-SEBS). In one embodiment, the functionalized styrene block copolymer is a MAH-g-SEBS containing 25 to 35 wt % polymerized styrene and 1 to 2 wt % maleic anhydride, based on the weight of the functionalized styrene block copolymer. An example of an MAH-g-SEBS copolymer is available from Kraton Corp., Houston, Tex., under the trademark KRATON® FG1901.

In one embodiment, the melt index (MI) of the functionalized styrene block copolymer is 35 to 45 g/10 min (ASTM D1238, 5 kg, 230° C.).

Polymer Component (A)/Combination of (i) and (ii)

In one embodiment, the polymer component (A) is a mixture of i) an anhydride and/or carboxylic acid functionalized, chlorinated olefin-based polymer, and/or ii) a styrene-based polymer and/or a functionalized styrene-based polymer, as described herein. In one embodiment, component A is selected from an anhydride and/or carboxylic acid functionalized, chlorinated olefin-based polymer.

Polyamide Wax Slurry Component (B)

In one embodiment, the composition includes a polyamide wax slurry as the Component (B). In embodiments, the inclusion of polyamide wax slurry, as a thickener, into the present compositions, can form stable adhesives having acceptable peel strength (e.g., 2.2 to 6 kgf/3 cm) in coated PET or PA fabrics.

In general, polyamide waxes are produced by the condensation reaction of an amine (e.g., an alkylenediamine such as ethylenediamine) with one or more fatty acids (e.g., stearic acid, 12-hydroxystearic acid, hydrogenated castor oil (MW~8,000), etc.). Examples of suitable amide waxes include, but are not limited to, ethylene bis-stearamide (EBS), stearyl amide, and stearylstearamide. In embodiments, the polyamide wax has a melting point of 120 to 150° C. The polyamide wax can be combined with an organic solvent with heating to form the slurry.

In embodiments, the polyamide wax slurry contains at least 5 wt % up to 40 wt % of a polyamide wax, with the remainder being an organic solvent (e.g., from 95 to 60 wt % solvent). Examples of suitable solvents include, but are not limited to, ethanol, isopropanol (IPA) and butanol. Polyamide wax slurries are available, for example, from HS Chem Co. Ltd., under the trademark MONORAL® (e.g., MONORAL® NT3300), among others.

In embodiments, the non-volatiles content of the polyamide wax slurry is at least 25 wt %, or at least 20 wt %.

Plasticizer Component (B)

In one embodiment, the composition includes a plasticizer as the Component (B). In embodiments, the inclusion of a plasticizer can be used to adjust the rheological properties of the composition for applications such as, but not limited to, a transfer coating process to apply the composition to a substrate. Adhesive compositions of the invention that include a plasticizer have demonstrated a high peel strength compared with an adhesive made without plasticizer (e.g., greater than 4 kgf/3 cm in PET fabric).

Examples of suitable plasticizers include, but are not limited to, acetyltributyl citrate (ATBC), di-isononyl-cyclohexane-1,2-dicarboxylate (DINCH), dioctyl-phthalate, and mixtures thereof. Such plasticizers are commercially available, for example, from KLJ Group under the trademark Kanatol 3400 BC, and BASF under the trademark Hexamoll® DINCH.

Solvent Component (C)

The composition further includes an organic solvent component (C).

In an embodiment, the solvent is a non-aromatic and non-chlorinated organic solvent. Examples of suitable non-aromatic and non-chlorinated solvents include methyl cyclohexane (MCH), ethyl cyclohexane, methyl ethyl ketone (MEK), cyclohexanone, ethyl acetate (EA), butyl acetate, and mixtures thereof.

In one embodiment, the organic solvent has a molecular weight (Mn) ranging from 45 to 100 g/mol.

Tackifier

In one embodiment, the composition includes a tackifier. Examples of suitable tackifiers include tackifying resins such as, but are not limited to, rosins and their derivatives, terpenes and modified terpenes, aliphatic, cycloaliphatic and aromatic resins ($C_5$ aliphatic resins, $C_9$ aromatic resins, and $C_5/C_9$ aliphatic/aromatic resins), hydrogenated hydrocarbon resins, and their mixtures, and terpene-phenol resins (TPR, used often with ethylene-vinyl acetate adhesives)). In one embodiment, the composition comprises a tackifier selected from the group consisting of rosins, glycerol esters of rosin, pentaerythritol esters of rosin, terpenes, $C_5$ to $C_9$ petroleum resins, and mixtures thereof.

The tackifier as a solid can be added directly to the composition, or first dissolved in an organic solvent (e.g., ethylene acetate). Tackifiers are available from a number of commercial sources, for example, Celeritas Chemicals, USA.

The inclusion of a tackifier can increase the peel strength of the halogen or halogen-free adhesive compositions. For example, inclusion of a tackifier can increase the peel strength of a halogen-containing adhesive to 4.5 kgf/3 cm in coated PET fabric or to 4.0 kgf/3 cm in coated PA fabric, and the peel strength of a halogen-free adhesive to 3.5 kgf/3 cm in coated PET or PA fabric.

Plasticizer

In one embodiment, the composition includes a polyamide wax slurry and a plasticizer. In embodiments, the inclusion of a plasticizer can be used to adjust the rheological properties of the composition for applications such as, but not limited to, a transfer coating process to apply the composition to a substrate. Adhesive compositions of the invention that include a plasticizer have demonstrated a high peel strength compared with an adhesive made without plasticizer (e.g., greater than 4 kgf/3 cm in PET fabric).

Examples of suitable plasticizers include, but are not limited to, acetyltributyl citrate (ATBC), di-isononyl-cyclohexane-1,2-dicarboxylate (DINCH), dioctyl-phthalate, and mixtures thereof. Such plasticizers are commercially available, for example, from KU Group under the trademark KANATOL 3400 BC, and BASF under the trademark HEXAMOLL DINCH.

Specific Embodiments

In one embodiment, the composition comprises
A) 0.5 to 40, or 2 to 35, or 5 to 30, or 5 to 20, or 5 to 15, or 10 to 25, or 15 to 25, wt % of at least one polymer selected from the following:
   i) an anhydride and/or carboxylic acid functionalized, chlorinated olefin-based polymer; or
   ii) a styrene-based polymer and/or a functionalized styrene-based polymer; or
   iii) a combination of i) and ii);
B) one of the following:
   i) 0.5 to 40, or 2 to 35, or 5 to 30, or 5 to 20, or 5 to 15, or 5 to 10, wt % of a polyamide wax slurry; or
   ii) 0.5 to 40, or 0.5 to 20, or 1 to 15, or 3 to 12, or 4 to 10, wt % of a plasticizer; and
C) 20 to 99, or 25 to 98, or 30 to 97, or 40 to 95, or 50 to 90, or 60 to 85, or 70 to 80, or 70 to 75, wt % of an organic solvent; each wt % based on the total weight of the composition.

In another embodiment, the composition comprises
A) 0.5 to 40, or 2 to 35, or 5 to 30, or 5 to 20, or 5 to 15, or 10 to 25, or 15 to 25, wt % of at least one polymer selected from the following:
   i) an anhydride and/or carboxylic acid functionalized, chlorinated olefin-based polymer; or
   ii) a styrene-based polymer and/or a functionalized styrene-based polymer; or
   iii) a combination of i) and ii);
B) 0.5 to 40, or 2 to 35, or 5 to 30, or 5 to 20, or 5 to 15, or 5 to 10, wt % of a polyamide wax slurry;
C) 20 to 97, or 25 to 96, or 30 to 95, or 40 to 94, or 50 to 90, or 60 to 85, or 70 to 80, or 70 to 75, wt % of an organic solvent; and
D) 1 to 30, or 2 to 25, or 3 to 20, or 5 to 15, wt % of a tackifier; and/or
E) 1 to 15 wt % of a plasticizer;
each wt % based on the total weight of the composition.

In one embodiment, the composition comprises at least 70, or at least 75, or at least 80, or at least 85, or at least 90, wt % of components B and C, based on the total weight of the composition. In one embodiment, the composition comprises 65 to 95, or 70 to 90, or 75 to 85, wt % of components B and C, based on the total weight of the composition. In one embodiment, the component B is a polyamide wax slurry. In another embodiment, the component B is a plasticizer.

Polymer Component (A) In various embodiments, the polymer component (A) can be present in the composition in an amount of from 0.5 to 40 wt %, based on the total weight of the composition. In one embodiment, the amount of polymer component (A) in the composition can be from a lower limit of 0.5, or 5, or 10, or 15, or 20, wt %, to an upper limit of 40, or 35, or 30, or 25, or 20, or 15, or 10, wt %, based on the total weight of the composition. All individual values from 0.5 to 40 wt % are included and disclosed herein. In one embodiment, the amount of the polymer component (A) in the composition can range from 0.5 to 40, or from 2 to 35, or from 5 to 30, or from 5 to 20, or from 5 to 15, or from 10 to 30, or from 15 to 25, wt %, based on the total weight of the composition.

In one embodiment, the composition is a halogenated composition, and the polymer component (A) comprises an anhydride and/or carboxylic acid functionalized, chlorinated olefin-based polymer. In one embodiment, the amount of the anhydride and/or carboxylic acid functionalized, chlorinated olefin-based polymer in the composition can be from a lower limit of 0.5, or 5, or 10, or 15, or 20, wt %, to an upper limit of 40, or 35, or 30, or 25, or 20, or 15, or 12, or 10, wt %, based on the total weight of the composition. All individual values from 0.5 to 40 wt % are included and disclosed herein. In one embodiment, the anhydride and/or carboxylic acid functionalized, chlorinated olefin-based polymer can be present in the composition in an amount of from 0.5 to 40, or 2 to 35, or 5 to 25, or 15 to 25, wt %, based on the total weight of the halogenated composition.

In another embodiment, the composition is a halogenated composition, and the polymer component (A) is a mixture of (i) an anhydride and/or carboxylic acid functionalized, chlorinated olefin-based polymer, and (ii) a styrene-based polymer and/or a functionalized styrene-based polymer. In one embodiment, the halogenated composition includes the polymer component (A) as a mixture of (i) and (ii) comprising, based on the total weight of the halogenated composition:
a) from 0.5 to 39.5 wt % of (i) an anhydride and/or carboxylic acid functionalized, chlorinated olefin-based polymer, and
b) from 39.5 to 0.5 wt % of (ii) a styrene-based polymer and/or a functionalized styrene-based polymer.

All individual values from 0.5 to 39.5 wt % are included and disclosed herein. In one embodiment, the amount of each of components (i) and (ii) in the composition can be from a lower limit of 0.5, or 5, or 10, or 15, or 20, wt %, to an upper limit of 39.5, or 35, or 30, or 25, wt %, based on the total weight of the composition. In one embodiment, each of components (i) and (ii) can be present in the composition in an amount of 0.5 to 39.5, or 5 to 30, or 5 to 15, wt %, based on the total weight of the composition.

In one embodiment, the composition is a non-halogenated composition. In one embodiment, the polymer component (A) of the non-halogenated composition is a styrene-based polymer and/or a functionalized styrene-based polymer, present in an amount of from a lower limit of 0.5, or 5, or 10, or 15, or 20, wt %, to an upper limit of 40, or 35, or 30, or 25, wt %, based on the total weight of the composition. All individual values from 0.5 to 40 wt % are included and disclosed herein. In one embodiment, the styrene-based polymer and/or a functionalized styrene-based polymer can be present in the composition in an amount from 0.5 to 40, or 5 to 30 wt %, or 10 to 25, wt %, based on the total weight of the halogenated composition.

Polyamide Wax Slurry Component (B) In one embodiment, component (B) is a polyamide wax slurry. In embodiments, the amount of thickener (polyamide wax slurry) can be varied to adjust the viscosity of the composition according to the workability requirement of the process to be used for applying the composition to a substrate, such as dipping, coating, extrusion coating, roll coating and blade coating. In one embodiment, the composition can be formulated with an amount of the polyamide wax slurry to vary the Brookfield (solution) viscosity of the composition at room temperature (about 26° C.) from 5 to 100,000 cP.

In one embodiment, the composition comprises the polyamide wax slurry component (B) from a lower limit of 0.5, or 1, or 5, or 9, or 10, wt %, to an upper limit of 40, or 30, or 20, or 15, wt %, based on the total weight of the composition. All individual values and subranges of from 0.5 to 40 wt % of the polyamide wax slurry are included and disclosed herein. In one embodiment, the amount of the polyamide wax slurry in the composition can range from 0.5 to 25, or from 1 to 20, or from 5 to 15, or from 5 to 10, wt %, based on the total weight of the composition.

Plasticizer Component (B). In one embodiment, component (B) is a plasticizer. As used herein, a plasticizer can include one or a mixture of two or more plasticizers. In one embodiment, the composition can comprise a plasticizer component (B) from a lower limit of 0.5, 1, or 2, or 4, or 5, or 9, or 10, wt %, to an upper limit of 40, or 25, or 20, or 15, or 14, or 12, or 10, wt %, based on the total weight of the composition. In one embodiment, a plasticizer is included in the composition in an amount of from 0.5 to 40, or 0.5 to 20, or 1 to 15, or from 2 to 10, or from 4 to 12, or from 5 to 10, wt %, based on the total weight of the composition. All individual values and subranges of from 0.5 to 40 wt % plasticizer are included and disclosed herein.

Solvent Component (C). As used herein, an organic solvent can include one or a mixture of two or more organic solvents. In one embodiment, the composition can comprise the organic solvent component (C) from a lower limit of 20, or 30, or 40, or 50, or 60, or 70, wt %, to an upper limit of 99, or 98, or 97, or 95, or 90, or 80, or 75, or 70, or 60, wt %, based on the total weight of the composition. The amount of the organic solvent (C) in the composition can range from 20 to 99, or from 20 to 98, or from 20 to 97, or from 50 to 70, or from 60 to 85, or from 70 to 95, or from 70 to 80, or from 70 to 75, wt %, based on the total weight of the composition. All individual values and subranges of from 20 to 99 wt % solvent are included and disclosed herein. In one embodiment, the solvent is selected from methyl cyclohexane (MCH), ethyl cyclohexane, methyl ethyl ketone (MEK), cyclohexanone, ethyl acetate (EA), butyl acetate, and mixtures thereof; and further selected from methyl cyclohexane (MCH), ethyl cyclohexane, methyl ethyl ketone (MEK), cyclohexanone, ethyl acetate (EA), and mixtures thereof, and further selected from methyl cyclohexane (MCH), ethyl cyclohexane, ethyl acetate (EA), and mixtures thereof. In one embodiment the organic solvent is one solvent or a mixture of two solvents. In one embodiment, the organic solvent is a mixture of two solvents, and further two solvents selected from methyl cyclohexane (MCH), ethyl cyclohexane, ethyl acetate (EA), and further the mixture of the two solvents comprises from 20 to 50 wt % ethyl acetate, based on weight of the composition.

In one embodiment, the composition comprises a mixture of two solvents at a weight ratio of a first solvent to a second solvent of 0.5 to 1, or 0.6 to 1, or 0.8 to 1, or 1 to 1, or 1.5 to 1, or 2 to 1. In one embodiment, the first solvent is selected from methyl cyclohexane (MCH), ethyl cyclohexane, methyl ethyl ketone (MEK), cyclohexanone and mixtures thereof, and further selected from methyl cyclohexane (MCH), ethyl cyclohexane, and mixtures thereof, and further selected from methyl cyclohexane (MCH), and the second solvent is selected from ethyl acetate (EA), butyl acetate, and mixtures thereof, and further selected from ethyl acetate (EA). In another embodiment, the first solvent is selected from ethyl acetate (EA), butyl acetate, and mixtures thereof and further selected from ethyl acetate (EA), and the second solvent is selected from methyl cyclohexane (MCH), ethyl cyclohexane, methyl ethyl ketone (MEK), cyclohexanone and mixtures thereof, and further selected from methyl cyclohexane (MCH), ethyl cyclohexane, and mixtures thereof, and further selected from methyl cyclohexane (MCH).

Tackifier The composition can optionally include a tackifier. In one embodiment, the composition can comprise a tackifier component from a lower limit of 1, or 2, or 5, or 10, wt %, to an upper limit of 30, or 25, or 20, or 15, wt %, based on the total weight of the composition. In one embodiment, a tackifier is included in the composition in an amount of from 1 to 30, or from 5 to 20, or from 5 to 15, or from 10 to 15, wt %, based on the total weight of the composition. All individual values and subranges of from 1 to 30 wt % tackifier are included and disclosed herein.

Plasticizer. The composition can optionally include a polyamide wax slurry and a plasticizer. In one embodiment, the composition can comprise a plasticizer component from a lower limit of 1, or 2, or 4, or 5, or 9, or 10, wt %, to an upper limit of 15, or 14, or 12, or 10, wt %, based on the total weight of the composition. In one embodiment, a plasticizer is included in the composition in an amount of from 1 to 15 wt %, or from 2 to 10, or from 4 to 12, based on the total weight of the composition. All individual values and subranges of from 1 to 15 wt % plasticizer are included and disclosed herein.

Coated Substrate

In one embodiment, the invention provides a coated substrate formed from the following:

a) a fabric substrate layer;

b) an adhesive layer formed from a first composition as described herein, comprising a polymer component (A), a polyamide wax slurry component (B), and an organic solvent component (C); and c) an olefin-based layer formed from a second composition comprising at least one olefin-based polymer.

In one embodiment, the invention provides a coated substrate formed from the following:

a) a fabric substrate layer;

b) an adhesive layer formed from a first composition as described herein, comprising a polymer component (A), a plasticizer (B), and an organic solvent component (C); and c) an olefin-based layer formed from a second composition comprising at least one olefin-based polymer.

In embodiments, the first composition is applied to the fabric substrate. Nonlimiting examples of suitable methods to apply the first composition to the fabric substrate include drawdown, rod coating, brushing, dipping, pouring, spraying and transfer printing techniques. In an embodiment, the first composition is poured onto a substrate and spread out by means of a coating bar or grooved (wound) rod.

In one embodiment, one side of the substrate is coated with the first composition. In one embodiment, two opposite sides of the substrate are coated with the first composition. In one embodiment, the entire substrate is coated with the first composition.

Advantageously, the first composition has sufficient penetration into a fabric substrate and wets with high adhesion for difficult-to-bond substrates.

In one embodiment, the first composition is dried after it is applied to the fabric substrate to evaporate at least 90, or 98, or 99, or 100, wt % of the solvents, based on the weight of the solvent in the first composition.

Nonlimiting examples of methods to dry the first composition after it has been applied to the fabric substrate include drying the article in an oven at a temperature greater than 100° C., or at least 130° C., or at least 150° C., for at least 0.5, or at least 1 minute, at least 2 minutes, or at least 3 minutes.

In an embodiment, the coating of the first composition on the fabric substrate has a coat weight after drying of from 1, or 5, or 7, or 10, or 15, or 18 or 20, or 25, up to 200, or 150, or 100, or 80, or 50, or 40, or 35, $g/m^2$.

In an embodiment, the olefin-based layer is at least partially in contact with the coating of the first composition on the fabric substrate. In one embodiment, the olefin-based layer is applied onto the olefin-based layer by extrusion coating or by lamination with a preformed olefin-based film.

In one embodiment, the coated substrate (or other article) has a peel strength of at least 2 up to 6 kgf/3 cm, measured in accordance with the T-Peel Test described herein. In one embodiment, the article has a peel strength of greater than or equal to 3 kgf/3 cm.

Fabric Substrate Layer. The fabric substrate layer may comprise any natural and/or synthetic materials. Synthetic materials include, for example, various synthetics based on polyolefins (e.g., polyethylene, polypropylene, etc.), nylon, polyester, polyurethane (e.g., a spandex material), polyamide, and blends or combinations thereof. Natural materials include, for example, cotton, silk, or blends thereof. In one embodiment, the fabric substrate layer is prepared from polyester, polyethylene or polypropylene.

In one embodiment, the fabric substrate layer is a nonwoven, polymeric, spunbond material. In another embodiment, the fabric substrate layer is a woven polymeric material.

In one embodiment, the fabric substrate layer comprises a material of a weight equal to or greater than 85, or 90, or 95, or 100, up to 500, or 400, or 300, or 200, or 150, grams per square meter ($g/m^2$). In one embodiment, the weight of the fabric substrate layer is from 90 to 500, or from 120 to 150, or from 150 to 400, or from 200 to 350, $g/m^2$.

In one embodiment, the thickness of the fabric substrate layer is equal to or greater than 0.2, or 0.3, or 0.4, up to 1, or 0.75, or 0.6, or 0.5, mm. In one embodiment, the thickness of the fabric substrate layer is from 0.2 to 1, or from 0.3 to 0.6, or from 0.4 to 0.5, mm.

In one embodiment, the fabric can be subjected to a pre-lamination treatment, for example, a corona surface treatment or impregnation.

In one embodiment, the fabric substrate layer comprises polyethylene terephthalate (PET). In one embodiment, the fabric substrate layer comprises polyamide (PA).

Adhesive Layer. The adhesive layer is formed from a first composition as described herein, which comprises at least (A) at least one polymer selected from i) an anhydride and/or carboxylic acid functionalized, chlorinated olefin-based polymer, or ii) a styrene-based polymer and/or a functionalized styrene-based polymer, or iii) a combination thereof; B) a polyamide wax slurry, and C) an organic solvent, the components as described herein.

In one embodiment, the polymer component (A) is an anhydride and/or carboxylic acid functionalized, chlorinated olefin-based polymer, as described herein, that has a chlorine content from 0.1 to 20 wt %, based on the total weight of the composition, or from 10 to 40 wt %, based on the total weight of the anhydride and/or carboxylic acid functionalized, chlorinated olefin-based polymer.

In one embodiment, the polymer component (A) is an anhydride and/or carboxylic acid maleic anhydride functionalized, chlorinated olefin-based polymer. In one embodiment, the polymer component (A) is a maleic anhydride functionalized chlorinated olefin based polymer having an amount of maleic anhydride functional group of from 0.75 to 3 wt % and a chlorine content from 10 to 40 wt %.

In one embodiment, the polymer component (A) is a styrene-based polymer and/or a functionalized styrene-based polymer, as described herein.

In one embodiment, the polymer component (A) is a styrene ethylene butene styrene (SEBS) block copolymer with a styrene content of equal to or less than 60%.

In one embodiment, the polymer component (A) is a mixture of i) an anhydride and/or carboxylic acid functionalized, chlorinated olefin-based polymer, and ii) a styrene-based polymer and/or a functionalized styrene-based polymer, as described herein.

In one embodiment, the solvent component (C) of the adhesive layer is selected from the group consisting of methyl cyclohexane (MCH), ethyl cyclohexane, methyl ethyl ketone (MEK), cyclohexanone, ethyl acetate (EA), butyl acetate, and mixtures thereof.

In one embodiment, the solvent solution component (C) of the adhesive layer contains no ethylene vinyl acetate.

In one embodiment, the first composition further includes a tackifier and/or a plasticizer, as described herein.

In one embodiment, the adhesive is prepared from a first composition comprising at least the following components, the wt % based on the total weight of the composition:

A) 0.5 to 40, or 2 to 35, or 5 to 30, or 5 to 20, or 5 to 15, or 10 to 25, or 15 to 25, wt % of at least one polymer selected from the following:
  i) an anhydride and/or carboxylic acid functionalized, chlorinated olefin-based polymer; or
  ii) a styrene-based polymer or a functionalized styrene-based polymer; or
  iii) a combination of i) and ii);
B) one of the following:
  (i) 0.5 to 40, or 2 to 35, or 5 to 30, or 5 to 20, or 5 to 15, or 5 to 10, wt % of a polyamide wax slurry; or
  ii) 0.5 to 40, or 0.5 to 20, or 1 to 15, or 3 to 12, or 4 to 10, wt % of a plasticizer;
C) 20 to 99, or 25 to 98, or 30 to 97, or 40 to 95, or 50 to 90, or 60 to 85, or 70 to 80, or 70 to 75, wt % of an organic solvent; and
D) 0 to 40, or 1 to 30, or 5 to 15, wt % of a tackifying agent;
  each wt % based on weight of the composition.

In one embodiment, the adhesive is prepared from a first composition comprising at least the following components, the wt % based on the total weight of the composition:

A) 0.5 to 40, or 2 to 35, or 5 to 30, or 5 to 20, or 5 to 15, or 10 to 25, or 15 to 25, wt % wt % of at least one polymer selected from the following:
  i) an anhydride and/or carboxylic acid functionalized, chlorinated olefin-based polymer; or
  ii) a styrene-based polymer or a functionalized styrene-based polymer; or
  iii) a combination of i) and ii);
B) 0.5 to 40, or 2 to 35, or 5 to 30, or 5 to 20, or 5 to 15, or 5 to 10, wt % of a polyamide wax slurry;
C) 20 to 98, or 20 to 97, or 25 to 96, or 30 to 95, or 40 to 94, or 50 to 90, or 60 to 85, or 70 to 80, or 70 to 75, wt % of an organic solvent; and
  at least one of
D) 1 to 30, or 2 to 25, or 3 to 20, or 5 to 15, wt % of a tackifying agent and/or
E) 1 to 15 wt % of a plasticizing agent;
  each wt % based on the weight of the composition.

Olefin-Based Layer

The olefin-based layer is formed from a second composition comprising at least one olefin-based polymer. The olefin-based polymer(s) comprise equal to or greater than 50 wt % units derived from olefinic monomers.

In one embodiment, the olefin-based layer comprises an olefin-based polymer which exhibits a density from 0.85 to 0.92 g/cc (measured according to measured according to ASTM D792) and/or a melt flow rate from 0.1 to 80 g/10 min (measured according to ASTM D-1238 under 2.16 kg @ 230° C.). All individual values and subranges of a density from 0.85 to 0.92 g/cc and a melt flow rate from 0.1 to 80 g/10 min, are included and disclosed herein. The density can be, for example, from a lower limit of 0.85, 0.87, 0.89, or 0.91 g/cc to an upper limit of 0.86, 0.88, 0.90 or 0.92 g/cc. In one embodiment, the density can range from 0.85 to 0.92, or from 0.85 to 0.89, or from 0.89 to 0.92, or from 0.86 to 0.91, g/cc. The melt flow rate can be, for example, from a lower limit of 0.1, 10, 30, 50 or 70 to an upper limit of 5, 25, 35, 55, 75 or 80, g/10 min. In one embodiment, the melt flow rate can range from 0.1 to 80, or from 0.1 to 50, or from 3 to 70, or from 30 to 80, or from 20 to 60, g/10 min.

In one embodiment, the olefin-based polymer comprises a propylene/α-olefin copolymer, preferably a propylene/ethylene copolymer, and at least one of (i) a styrene block copolymer, (ii) a homogeneously branched ethylene/α-olefin copolymer, (iii) an olefin block copolymer (OBC), and (iv) a random polypropylene copolymer. In one embodiment, the olefin-based layer comprises a propylene/α-olefin copolymer and at least two, three or all four of copolymer components (i)-(iv). The olefin-based polymer can comprise a single propylene/α-olefin copolymer or a blend of two or more propylene/α-olefin copolymers. Each of the copolymer components (i) through (iv) can be present neat or as a blend of two or more copolymers.

The olefin-based polymer can also comprise one or more optional additives such as processing aids, extenders, blocking agents, pigments and/or dyes, antioxidants, UV-stabilizers and/or absorbers, flame retardants, fillers (such as talc, calcium carbonate), and the like.

In one embodiment, the olefin-based polymer comprises at least 30, or at least 40, or at least 50, wt %, propylene/α-olefin copolymer. In one embodiment, the maximum amount of propylene/α-olefin copolymer in the olefin-based polymer typically is 90, or 80, or 70, wt %.

In one embodiment, the total amount of copolymer components (i) through (iv) in the olefin-based polymer is at least 10, or 20, or 30 wt %. In one embodiment, the maximum total amount of copolymer components (i) through (iv) in the olefin-based layer is 70, or 60, or 50, wt %.

In one embodiment, the propylene/α-olefin copolymer is characterized as having substantially isotactic propylene sequences. "Substantially isotactic propylene sequences" means that the sequences have an isotactic triad (mm) measured by $^{13}$C NMR of greater than 0.85, or 0.90, or 0.92, or 0.93. Isotactic triads are well-known in the art and are described in, for example, U.S. Pat. No. 5,504,172 and WO 00/01745, which refers to the isotactic sequence in terms of a triad unit in the copolymer molecular chain determined by $^{13}$C NMR spectra.

The propylene/α-olefin copolymer can have a melt flow rate (MFR) in the range of from 0.1 to 25 g/10 minutes, measured in accordance with ASTM D-1238 (at 230° C./2.16 Kg). All individual values and subranges from 0.1 to 25 g/10 minutes are included and disclosed by this range. In one embodiment, the MFR of the propylene/α-olefin copolymer can be from a lower limit of 0.1, 0.2, or 0.5, g/10 minutes to an upper limit of 25, or 15, or 10, or 8, or 5 g/10 minutes. In one embodiment, the propylene/α-olefin copolymer can have a MFR in the range of 0.1 to 10, or 0.2 to 10, g/10 minutes.

In one embodiment, the propylene/α-olefin copolymer has a density from 0.85 to 0.89 g/cc. All individual values and subranges from 0.850 to 0.890 g/cc are included and disclosed herein. In one embodiment, the density of the propylene/α-olefin copolymer can be from a lower limit of 0.850, 0.860, 0.870 or 0.880, g/cc, to an upper limit of 0.855, 0.865, 0.875, 0.885 or 0.890, g/cc. In one embodiment, the density can be from 0.850 to 0.890, or from 0.850 to 0.870, or from 0.870 to 0.890, or from 0.8 to 0.888, g/cc.

The propylene/α-olefin copolymer comprises units derived from propylene and one or more α-olefin comonomers. Exemplary comonomers utilized to manufacture the propylene/α-olefin copolymer are $C_2$ and $C_4$ to $C_{10}$ α-olefins, for example, $C_2$, $C_4$, $C_6$ and $C_8$ α-olefins. In one embodiment, the propylene/α-olefin copolymer comprises from 1 to 30 wt % of one or more units derived from one or more α-olefin comonomers.

In one embodiment, the propylene/α-olefin copolymer has a molecular weight distribution (MWD), defined as weight average molecular weight divided by number average molecular weight ($M_w/M_n$) of 3.5 or less, or 3.0 or less, or from 1.8 to 3.0.

Suitable propylene/α-olefin copolymers are described, for example, in U.S. Pat. No. 6,960,635 and U.S. Pat. No. 6,525,157. Suitable propylene/α-olefin copolymers are commercially available, for example, from The Dow Chemical Company, under the trade name VERSIFY, or from Exxon-Mobil Chemical Company, under the trade name VISTA-MAXX.

In one embodiment, the propylene/α-olefin is a propylene/ethylene copolymer.

In one embodiment, the olefin-based layer is formed from a composition comprising a propylene/α-olefin copolymer and an olefin block copolymer (OBC). Suitable olefin-block copolymers (OBCs) are commercially available, for example, from The Dow Chemical Co., under the trade name INFUSE Olefin Block Copolymers.

Articles

In yet another embodiment, the invention provides an article comprising at least one component formed from the coated substrate according to any embodiment disclosed herein.

In an embodiment, the article is a laminate.

Nonlimiting examples of articles include food packages, pipes, bottles, bags, synthetic leather, tarpaulins, conveyor belts, hoses, tubes, back packs, briefcases, totes, and tents, air mattresses, artificial leather, and luggage. Additional uses are footwear adhesives, adhesives to bond elastomers to metal, and over-molding of technical textiles with polyolefins An article may comprise a combination of two or more embodiments described herein.

Definitions

Unless stated to the contrary, implicit from the context, or customary in the art, all parts and percents are based on weight, and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the optical cable protective components made from these compositions are defined.

"Blend," "polymer blend" and like terms, as used herein, mean a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

"Chlorinated olefin-based polymer," as used herein, refers to an olefin-based polymer comprising at least one chlorine.

"Functionalized, chlorinated olefin-based polymer," as used herein, refers to an olefin-based polymer comprising at least one chlorine, and at least one chemical group selected from the following: anhydride, carboxylate, —COOH, amine, OH, carbonyl, acrylate, or combinations thereof.

"Composition" and like terms, as used herein, mean a mixture or blend of two or more materials which comprise the composition, as well as reaction products and decomposition products formed from the materials of the composition.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Elastomer" and like terms, as used herein, denote a polymer having viscoelasticity. Generally, elastomers will have lower tensile modulus and higher failure strain relative to other materials, such as thermoplastics.

"Interpolymer" and like terms, as used herein, mean a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

"Layer" and like terms, as used herein, mean a single thickness or coating of a compound, polymer or composition spread out or covering a surface.

"Olefin-based layer" and like terms, as used herein, mean a layer formed from a composition comprising at least one olefin-based polymer. An olefin-based polymer comprises a majority wt % of monomer units derived from an olefin (e.g., ethylene or propylene).

"Nonwoven fabric" and like terms, as used herein, mean a fabric or like material that is made from fibers, bonded together by chemical, mechanical, heat or solvent treatment. The term is used to denote fabrics, like felt, than are neither woven nor knitted.

"Olefin-based polymer" and like terms, as used herein, refers to a polymer that comprises a majority amount of polymerized olefin monomer, for example ethylene or propylene (based on weight of the polymer) and, optionally, may contain at least one comonomer.

"Polyamide wax slurry" refers to a suspension of at least one polyamide wax in at least one organic solvent. The composition includes a polyamide wax slurry component (B) as a thickening agent and rheology modifier. The inclusion of the polyamide wax slurry thickener into the present halogen or halogen-free compositions results in stable adhesive compositions (i.e., no phase separation) and adjustable viscosity which can meet different workabilities.

"Polymer" and like terms, as used herein, refer to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

"Propylene-based polymer" as used herein, refers to a polymer that comprises, in polymerized form, a majority weight percent (wt %) of propylene monomer (based on the total weight of the polymer), and optionally may comprise one or more comonomers.

"Propylene-based interpolymer", "propylene-based elastomer" and like terms, as used herein, refer to a polymer that comprises, in polymerized form, a majority weight percent (wt %) of propylene monomer (based on the total weight of the polymer), and at least one comonomer.

"Propylene/α-olefin interpolymer," as used herein, refers to an interpolymer that comprises, in polymerized form, a majority amount of propylene monomer (based on the weight of the interpolymer), and at least one α-olefin.

"Propylene/α-olefin copolymer," as used herein, refers to a copolymer that comprises, in polymerized form, a majority amount of propylene monomer (based on the weight of the copolymer), and an α-olefin, as the only two monomer types.

"Propylene/ethylene copolymer," as used herein, refers to an copolymer that comprises, in polymerized form, a majority weight percent (wt %) (i.e., >50 wt %) of propylene monomer (based on the weight of the copolymer), and ethylene, as the only two monomer types.

"Propylene random interpolymer," "Propylene random copolymer," and like terms, as used herein, refer to a polymer that comprises, in polymerized form, a majority weight percent (wt %) of propylene monomer (based on the weight of the polymer), and at least one comonomer randomly distributed across the polymer chain.

"Ethylene-based polymer" as used herein, refers to a polymer that comprises, in polymerized form, a majority weight percent (wt %) of ethylene monomer (based on the total weight of the polymer), and optionally may comprise one or more comonomers.

"Ethylene-based interpolymer," as used herein, refers to a polymer that comprises, in polymerized form, a majority weight percent of ethylene (based on the weight of the interpolymer), and at least one comonomer.

"Ethylene/α-olefin interpolymer," as used herein, refers to an interpolymer that comprises, in polymerized form, a majority amount of ethylene monomer (based on the weight of the interpolymer), and at least one α-olefin.

"Ethylene/α-olefin copolymer," as used herein, refers to a copolymer that comprises, in polymerized form, a majority amount of ethylene monomer (based on the weight of the copolymer), and an α-olefin, as the only two monomer types.

"Spunbond fabric" and like terms, as used herein, mean a fabric or like material that is made by depositing extruded, spun filaments onto a collecting belt in a uniform, random manner followed by bonding of the fibers.

"Styrene-based polymer" and like terms, as used herein, refer to a polymer that contains over 10 wt % of styrene, based on the weight of the polymer, and optionally contains one or more other comonomers.

"Styrene block copolymer" and like terms, as used herein, refer to an elastomer having at least one block segment of a styrene monomer in combination with another block segment of another comonomer. The structure of the styrene block copolymers can be of the linear or radial type, and of the diblock or triblock type.

"Functionalized styrene-based polymer," as used herein, refers to an styrene-based polymer comprising at least one chemical group selected from the following: anhydride, carboxylate, —COOH, amine, OH, carbonyl, acrylate, or combinations thereof.

Test Methods

Unless otherwise indicated for a specific material, test methods include the following.

Coat weight, in $g/m^2$, is measured by weighing the dried coated fabric (in grams) and determining the difference between the weight of the fabric and the weight of the dried coated fabric. Coat weight is then calculated by dividing the measured weight difference by the areas.

Density, in g/cc or $g/cm^3$, is measured according to ASTM D792.

Melt Index, $I_5$ (MI), in g/10 min., for styrene block copolymers is measured according to ASTM D-1238, condition 230° C./5.0 kilogram (kg) weight.

Melt flow rate (MFR), in g/10 min., of the olefin block copolymer is measured according to ASTM D-1238 at condition 230° C./2.16 kg.

Peel strength testing of coated fabrics, in kgf/3 cm, was carried out following an Instron T-peel strength test standards according to ASTM F2256. Samples are prepared by coating the fabric with the adhesive composition, drying the composition, covering the primed fabric surface with a polyolefin (POE) sheet to form a pre-laminate structure, and heat laminating the structure, as described herein. The central portion of the laminate was cut into three specimens, each 3 cm×15 cm and about 0.8 mm thick. The T-Peel Test is conducted on an INSTRON using a 180° peel test with a crosshead speed of 300 mm/min according to ASTM D751-06. Data was collected for average load registered for 38.1 mm of the delamination which manifested as peel strength (kgf/3 cm), equal to average load/width.

Softening point (ring-and-ball softening point) is measured in accordance with ASTM E28.

Specific Embodiments

Materials and Reagents—the following materials are employed.

TABLE 1

Raw Materials
*The POE film could be formed from other Elastomer products, such as, for example, ENGAGE 8200;

| Material | Specification |
|---|---|
| PET Fabric | Polyethylene terephthalate (PET) fabric; 44 × 44 yarns/inch$^2$, weight: 95.3 g/m$^2$, thickness: ~0.5 mm (Nan Ya Plastics Corporation, Taiwan) |
| PA Fabric | Polyamide (PA) fabric, 40 × 40 yarns/inch$^2$, weight: 137.5 g/m$^2$, thickness: ~0.3 mm (Lojel Plastic Inc., China) |
| POE Sheet* | Polyolefin elastomer (POE) sheet, density of 0.87 g/cc, MFR of 3.35 g/10 min., blend of 20 wt % Infuse ® olefin block copolymer (OBC) and 80 wt % Versify ® propylene/α-olefin copolymer, Tm: 98° C., thickness: ~0.3 mm (The Dow Chemical Co.) |
| Commercial adhesive | LOTPO adhesive, SEBS based toluene solution, 20-30 wt % solids, viscosity: 1500-2500 cP (Lojel Plastic Inc., China) |
| HARDLEN F-2P MAH-g-CPO | Maleic anhydride grafted chlorinated polyolefin (MAH-g-CPO), 1.6 wt % MAH, 20 wt % Cl, 100 wt % solids content (Toyobo Co. Ltd., Japan) |
| KRATON G1652 SEBS | Styrene/ethylene/butylene/styrene (SEBS) copolymer, 30% styrene, melt index (MI): 5 g/10 min. (230° C., 5 Kg) (Kraton Performance Polymers, Inc.) |
| KRATON G1643 ERS SEBS | Enhanced rubber segment styrene/ethylene/butylene/styrene (ERS SEBS) copolymer, 18% Styrene, MI: 18 g/10 min. (230° C., 5 Kg) (Kraton Performance Polymers, Inc) |
| KRATON FG1901 MAH-g-SEBS | Maleic anhydride grafted styrene/ethylene/butylene/styrene (MAH-g-SEBS), 30 wt % styrene, 1.7 wt % MAH, MI: 22 g/10 min. (230° C., 5 Kg) (Kraton Performance Polymers, Inc) |
| MONORAL NT3300 polyamide wax slurry | Polyamide wax slurry (thickener), 20% solid content, solvent are ethanol and isopropyl alcohol (IPA) (HS Chem Co. Ltd, Korea) |
| S202 tackifier | Glycerol ester of rosin (tackifier), softening point: 85-88° C. (Guangdong Hualin Chemical Co., Ltd., China) |
| MCH | Methyl cyclohexane (MCH) (solvent), C$_7$H$_{14}$, Mn: 98, 119 g/mol, analytical reagent (AR) (Sinopharm Chemical Reagent Co., China) |
| MEK | Methyl ethyl ketone (MEK) (solvent), C$_4$H$_8$O, Mn = 72.11 g/mol, AR (Sinopharm Chemical Reagent Co., China) |
| EA | Ethyl acetate (EA) (solvent), C$_4$H$_8$O$_2$, Mn = 88.12 g/mol, AR (Sinopharm Chemical Reagent Co., China) |
| KANATOL 3400AC ATBC | Acetyl Tributyl Citrate (ATBC) (plasticizer), AR (Kanatol 3400AC KLJ Group] |

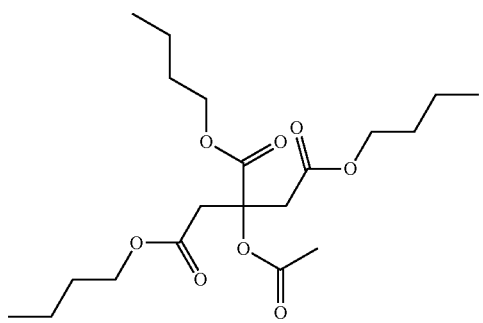

| HEXAMOLL DINCH | Di-isononyl-cyclohexane-1,2-dicarboxylate (plasticizer), AR (BASF) |

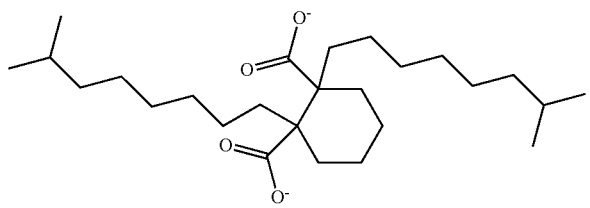

ENGAGE 8100; ENGAGE 8003; INFUSE 9100; INFUSE 9500; VERSIFY 4200; VERSIFY 4301; NORDEL IP 4770P; NORDEL IP 4760P.

In Study 1, five test examples (including one blank) were prepared according to the formulations provided in Table 2A and 2B, below, for coating onto a PET fabric and a PA fabric by a wire rod method. For the blank (CE1), the POE sheet was laminated directly to the fabric without any adhesive.

TABLE 2A

Comparable and inventive adhesives coated by wire rod method

| Adhesive Composition (wt %) | CE-1 blank | CE-2 | CE-3 | IE-4' | IE-5' | CE-6 | IE-1 | IE-2 | IE-3 | IE-4 | IE-5 |
|---|---|---|---|---|---|---|---|---|---|---|---|
| Commercial 2k adhesive | | | 100.00 | | | | | | | | |
| KRATON G1652, SEBS | | | | | | 10.00 | | | 6.06 | | |
| KRATON G1643, ERS SEBS | | | | 18.18 | | | 7.27 | | | 6.06 | |
| KRATON FG1901, MAH-g-SEBS | | | | | 18.18 | | | 7.27 | | | 6.06 |
| HARDLEN F2P, MAH-g-CPO, | | | | | | 10.00 | | | 6.06 | 6.06 | 6.06 |
| S202, glycerol ester of rosin | | 20.00 | | | | | 10.91 | 10.91 | 6.06 | 6.06 | 6.06 |
| MONORAL NT3300, polyamide wax slurry | | | | 9.09 | 9.09 | | 9.09 | 9.09 | 9.09 | 9.09 | 9.09 |
| Methyl cyclohexane | | | | 72.73 | 72.73 | 40.00 | 29.09 | 29.09 | 48.48 | 48.48 | 48.48 |
| Ethyl acetate | | 80.00 | | | | 40.00 | 43.64 | 43.64 | 24.24 | 24.24 | 24.24 |
| Total weight | — | 100 | 100 | 100 | 100 | 100 | 100 | 100 | 100 | 100 | 100 |

TABLE 2B

Comparable and inventive adhesives coated by wire rod method

| Adhesive Composition (wt %) | | CE-1 blank | CE-2 | CE-3 | IE-4' | IE-5' | CE-6 | IE-1 | IE-2 | IE-3 | IE-4 | IE-5 |
|---|---|---|---|---|---|---|---|---|---|---|---|---|
| Average Coat weight, g/m² | PET fabric | — | 30.00 | 20.00 | 29.50 | 29.50 | 30.20 | 29.50 | 29.50 | 29.50 | 29.50 | 29.50 |
| | PA fabric | — | 8.00 | 8.00 | 9.50 | 9.50 | 9.45 | 9.50 | 9.50 | 9.50 | 9.50 | 9.50 |
| Ave. Peel Strength (kgf/3 cm) | PET fabric | 0.51 | 0.54 | 1.60 | 2.25 | 3.21 | 4.00 | 2.91 | 3.66 | 4.57 | 4.25 | 4.35 |
| | PA fabric | 0.33 | — | — | 0.45 | 3.03 | — | 0.84 | 3.51 | 3.79 | 4.00 | 3.95 |

In Study 2, five test examples according to the invention and four comparative examples (including one blank) were prepared according to the formulations provided in Table 3, below, for coating onto a PET fabric by a transfer printing method.

TABLE 3

Comparable and inventive adhesives coated by transfer printing method

| Adhesive Components (wt %) | CE-7 blank | CE-8 | CE-9 | CE-10 | IE-6 | IE-7 | IE-8 | IE-9 | IE-10 |
|---|---|---|---|---|---|---|---|---|---|
| Commercial 2K adhesive | 100.00 | | | | | | | | |
| Kraton G1652, SEBS | | | | 20.00 | 19.05 | 18.18 | | | 19.05 |
| Kraton FG1901, MAH-g-SEBS | | | 20.00 | | | | 19.05 | 18.18 | |
| Hexamoll DINCH plasticizer | | | | | 4.76 | 9.09 | 4.76 | 9.09 | |
| Kanatol | | | | | | | | | 4.76 |

TABLE 3-continued

Comparable and inventive adhesives coated by transfer printing method

| Adhesive Components (wt %) | CE-7 blank | CE-8 | CE-9 | CE-10 | IE-6 | IE-7 | IE-8 | IE-9 | IE-10 |
|---|---|---|---|---|---|---|---|---|---|
| 3400AC, ATBC plasticizer | | | | | | | | | |
| Methyl cyclohexane | | | 80.00 | 80.00 | 76.19 | 72.73 | 76.19 | 72.73 | 76.19 |
| Total weight | — | 100 | 100 | 100 | 100 | 100 | 100 | 100 | 100 |
| Average coat weight, g/m$^2$ | — | 20.00 | 12.00 | 12.00 | 12.00 | 12.00 | 12.00 | 12.00 | 12.00 |
| Average Peel Strength on PET fabric (kgf/3 cm) | 1.00 | 2.00 | 3.25 | 1.10 | 4.10 | 5.41 | 4.30 | 4.10 | 3.10 |

Adhesive Preparation. The adhesive compositions (Tables 2 and 3) were prepared by dissolving the base resins (polymer (A)) in an organic solvent, separately in advance, as follows: (1) 20 wt % of MAH-g-CPO in methyl cyclohexane (MCH), (2) 20 wt % of SEBS, ERS SEBS or MAH-g-SEBS in methyl cyclohexane (MCH), and (3) 20 wt % of S202 ester of rosin in ethyl acetate (EA). The base resin solutions, thickener and plasticizer were introduced into a 3-neck flask according to the different formulations, then stirred at room temperature for over 15 minutes at 500 to 2000 rpm. The homogeneous adhesive compositions were then sealed in glass bottles for later application.

Solid content of the adhesive samples was 20 wt %. Stability of the formulations was judged by visual inspection. Phase-separation after 24 hours at room temperature indicated that the stability of the formulation was poor. If no phase-separation at room temperature occurs after 6 months, the stability is considered acceptable.

Fabric Adhesion Procedures. The fabric adhesion process included four steps: coating the adhesive onto the fabric, oven drying the adhesive layer (at 120° C.) to remove organic solvents, hot lamination of the POE sheet onto the adhesive layer of the coated fabric (at 115° C.), and T-peel strength testing.

A) Wire Rod Coating Process. Wire rod coating of the adhesive compositions (Table 2) onto the PET and PA fabrics was conducted according to the following steps:
1) Fix the fabric (~20 cm×19 cm; thickness 0.5 mm) onto a print paper by adhesive tapes.
2) Fix the fabric sample from step 1 with adhesive tape onto a K-Coater (K 202 control coater, RK PrintCoat Instruments, Ltd, UK). Fix the right wire rod (No. 1 yellow K-bar, RK PrintCoat Instruments, Ltd., UK) of the device, leaving an adequate portion of the tape to hold the adhesive composition to guarantee no penetration of adhesive into fabric before coating.
3) Add 10 g to 20 g adhesive composition onto the fabric with the tape covered. Start the motor of the device and apply the adhesive composition quickly.
4) Release the wire rod and clean it quickly. Remove the sample and place it in a ventilation hood for 5 minutes. Place the sample into a hot oven at 120° C. for 3 minutes.
5) Remove the sample from the oven, and place it into the hood to cool to room temperature.
6) Measure the coat weight (e.g., 15-35 gms for PET fabric, 8-15 gms for PA fabric).

B) Transfer Printing Coating Process. Transfer printing coating of the adhesive compositions (Table 3) onto the PET fabrics was conducted according to the following steps:

1) Fix a release paper (30 cm×30 cm) onto the coater. Select a winding bar with the correct size/width to match the viscosity of the adhesive composition, and place the winding bar on the end of the release paper.
2) Add 10 g to 20 g adhesive composition onto the release paper, and quickly scrape the adhesive composition along the lengthwise of the paper with the winding bar.
3) Quickly place the fabric onto the coated release paper before the adhesive dries out. Place the sample in a ventilation hood for 5 minutes, and then move the sample into a hot oven at 120° C. for 3 minutes
4) Remove the sample from the oven, and place it into the hood to cool it to room temperature. The adhesive film can then be transferred onto the fabric side after peeling off the release paper.
5) Place the coated fabric onto a POE film, and pat the fabric with hands gently to ensure the coated fabric and the POE film are in close contact. Then pass the coated fabric/POE film sheeting through a two roll mill to form a pre-laminate structure.

Lamination. A heat lamination procedure was conducted according to the following steps:
1) The POE calendered sheet is prepared before lamination.
2) Set the hot press (compression molder) at the desired temperature (e.g., 115±2° C.) and compression force (e.g., 4 kN). Place a PET nonwoven pad onto the bottom platen of the press to ensure all the sheet points bear stress evenly. For the blank (CE-1), the POE sheet was laminated directly onto the fabric without the adhesive layer.
3) Place the POE sheet (size: 15×15 cm, thickness: 0.3±0.1 mm) on the top of the primed side of the fabric. Insert a tape of paper between the POE sheet and fabric along one end of the laminate for easy release after lamination.
4) Open the press and place the POE sheet/fabric onto the pads. Cover the POE sheet with an aluminum foil to avoid sticking of the POE sheet and the platen. Close the press quickly.
5) Start timing and open press at the set time (e.g., 12 seconds).
6) Remove the sample and cool it to room temperature with the foil side down.

Coat Weight. In the field of coated fabrics, coat weight is generally used in lieu of coat thickness. For the samples, the coat weight for both the inventive examples and comparative examples are 8 to 30 grams per square meter (g/m$^2$).

Testing of the Laminates. The Instron peel strength testing of coated fabrics was carried out following the T-peel test standards according to ASTM F2256. Three rectangular specimens (size: 3 cm×15 cm, thickness: 0.8 mm) were cut along the longitudinal direction of the laminated samples from the central portion of the sample. The peel strength was measured on an Instron using 180 degree peel test with crosshead speed at 300 mm/min. Data was collected for average load registered for 38.1 mm of the delamination which manifested as peel strength (kgf/3 cm), equal to average load/width. The average load (kgf) was recorded and average peel strength (kgf/3 cm) was calculated from three test specimens per example.

Results

Table 2/Comparable and Inventive Adhesives Coated by Wire Rod Method

Adhesion in Coated PET Fabric. As seen in Table 2, the blank sample CE-1 had low peel strength (0.51 kgf/3 cm), which is caused by pure mechanical interlocking effect between the PET fabric and the POE sheet. Comparative example CE-2, which used tackifier alone between the PET fabric and POE sheet, also had very low peel strength (0.54 kgf/3 cm), which indicates that the use of tackifier alone did not provide sufficient adhesion between PET fabric and POE sheet.

With the introduction of tackifier into the ERS SEBS or MAH-g-SEBS based formulations, the peel strength of IE-1 (2.91 kgf/3 cm) was higher than that of its corresponding example IE-4' (2.25 kgf/3 cm) which did not include tackifier. The peel strength of IE-2 (3.66 kgf/3 cm) was higher than that of its corresponding example IE-5' (3.21 kgf/3 cm). This indicates that the introduction of tackifier can further improve the peel strength of ERS SEBS or MAH-g-SEBS based adhesives, with all of the peel strength data higher than that of the commercial adhesive available (1.6 kgf/3 cm).

For the MAH-g-CPO/SEBS-based halogen adhesive CE-6, the peel strength was high (4 kgf/3 cm) but stability was poor with obvious phase separation observed after storage for 1 day. With the introduction of tackifier and thickener into formulation, inventive example IE-3 became stable and its peel strength was increased to 4.57 kgf/3 cm. The replacement of SEBS by ERS SEBS or MAH-g-SEBS, showed an increased peel strength for IE-4 (4.25 kgf/3 cm) and IE-5 (4.35 kgf/3 cm), which were both higher than the peel strength of CE-6 (4 kgf/3 cm).

Adhesion in Coated PA Fabric. Comparing the peel strength data of IE-4' with IE-1 or IE-5' with IE-2 in the coated PA fabric, the peel strength was further improved by the addition of the tackifier. In addition, synergistic performance of SEBS or MAH-g-SEBS with the tackifier can be found in all of the inventive examples, IE-1 through IE-5.

In summary, compared to the commercial 2k adhesive CE-3 (1.6 kgf/3 cm in the PET fabric), the non-halogen based inventive adhesives IE-1 and IE-2 had a higher peel strength (2.9 and ~3.7 kgf/3 cm, respectively) in the coated PET fabric. The halogen-free inventive adhesives are also environmentally friendly (no aromatic solvents, no halogen in raw material), possess a flexible workability, and are cost effective (low or comparable price) compared to commercial adhesives.

The halogen-based inventive adhesive examples (IE-3, IE-4, IE-5) had a higher peel strength (4.6, 4.25, 4.35, kgf/3 cm, respectively) in the coated PET fabric compared to the coated PA fabric (3.79, 4.00, 3.95, kgf/3 cm) in the coated PA fabric. While not being bound to any particular theory, those results may be attributed to the morphology of the PA fabric which was smoother than that of the PET fabric resulting in less interlocking between the adhesive coat and the PA fabric. The halogen-based inventive adhesives are also environmentally friendly (no aromatic solvents) and possess a flexible workability.

Table 3/Comparable and Inventive Adhesives Coated by Transfer Printing Method

Adhesion in Coated PET Fabric. The blank sample CE-7 was composed of the POE sheet directly laminated to the PET fabric without any adhesive inbetween the two layers. The corresponding peel strength was low (1 kgf/3 cm). The commercial 2K adhesive CE-8 provided a peel strength of 2 kgf/3 cm.

The pure MAH-g-SEBS and SEBS samples, CE-9 and CE-10, provided a peel strength of 3.25 and 1.10 kgf/3 cm, respectively.

The addition of the DINCH plasticizer improved the peel strength significantly. The SEBS-based adhesive IE-6 plus 5 wt % DINCH plasticizer provided a peel strength of 4.1 kgf/3 cm, and an even higher peel strength for IE-7 at 5.41 kgf/3 cm with the addition of 10 wt % DINCH. The MAH-g-SEBS based adhesives IE-8 and IE-9 made with 5 wt % and 10 wt % DINCH, respectively, also provided a high peel strength at 4.3 and 4.1.

The addition of the ATBC plasticizer in the SEBS-based adhesive IE-10 produced a peel strength of 3.1 kgf/3 cm.

It is specifically intended that the present invention not be limited to the embodiments and illustrations contained herein, but include modified forms of those embodiments, including portions of the embodiments and combinations of elements of different embodiments, as come within the scope of the following claims.

We claim:

1. A composition comprising at least the following:
   A) a mixture of:
      i) a maleic anhydride functionalized, chlorinated olefin-based polymer; and
      ii) at least one of styrene-ethylene/butylene-styrene (SEBS) block copolymers, enhanced rubber segment styrene-ethylene/butylene-styrene block copolymers (ERS SEBS), or a maleic anhydride grafted styrene-ethylene/butylene-styrene copolymer (MAH-g-SEBS);
   B) a polyamide wax slurry; and
   C) an organic solvent.

2. The composition of claim 1, comprising:
   A) 0.5 to 40 wt % of the mixture;
   B) 0.5 to 40 wt % of the polyamide wax slurry; and
   C) 20 to 99 wt % of the organic solvent;
   the wt % based on the total weight of the composition.

3. The composition of claim 1, wherein the component C organic solvent is a non-aromatic and non-chlorinated solvent.

4. The composition of claim 1 wherein the maleic anhydride functionalized chlorinated olefin-based polymer of Component A has a maleic anhydride content from 0.75 to 3 wt %, based on the weight of the anhydride functionalized, chlorinated olefin-based polymer.

5. The composition of claim 1 wherein the chlorinated olefin-based polymer of Component A is a chlorinated propylene-based polymer.

6. An article comprising at least one component formed from the composition of claim 1.

7. A composition comprising:
   A) at least one polymer selected from the following:
      i) an anhydride and/or carboxylic acid functionalized, chlorinated olefin-based polymer; or ii) a styrene-based polymer and/or a functionalized styrene-based polymer; or
iii) a combination of i) and ii);
B) a polyamide wax slurry;
C) an organic solvent, and
D) a tackifier.

8. The composition of claim 7, wherein component A is a maleic anhydride (MAH) functionalized chlorinated olefin-based polymer.

9. The composition of claim 7, wherein component A is a mixture of
i) a maleic anhydride functionalized chlorinated olefin-based polymer, and
ii) a styrene-based polymer and/or a functionalized styrene-based polymer.

10. The composition of claim 9 wherein component A is a mixture of
i) a maleic anhydride functionalized chlorinated olefin-based polymer, and
ii) a styrene-ethylene/butylene-styrene (SEBS) block copolymer.

11. The composition of claim 9 wherein component A is a mixture of
i) a maleic anhydride functionalized chlorinated olefin-based polymer, and
ii) an enhanced rubber segment styrene-ethylene/butylene-styrene block copolymer.

12. The composition of claim 9 wherein component A is a mixture of
i) a maleic anhydride functionalized chlorinated olefin-based polymer, and
(ii) a maleic anhydride grafted styrene-ethylene/butylene-styrene copolymer.

13. The composition of claim 7, wherein the component C organic solvent is a non-aromatic and non-chlorinated solvent.

14. An article comprising at least one component formed from the composition of claim 7.

15. A coated substrate formed from the following:
a) a fabric substrate layer;
b) an adhesive layer which is formed from a first composition comprising at least the following:
A) at least one polymer selected from the following:
i) an anhydride and/or carboxylic acid functionalized, chlorinated olefin-based polymer; or
ii) a styrene-based polymer or a functionalized styrene-based polymer; or
iii) a combination of i) and ii);
B) a polyamide wax slurry; and
C) an organic solvent; and
c) an olefin-based layer formed from a second composition comprising at least one olefin-based polymer.

16. The coated substrate of claim 15, wherein the adhesive layer further comprises a tackifier.

17. The composition of claim 15, wherein the olefin-based layer (C) comprises a propylene/ethylene copolymer.

18. The composition of claim 15, wherein the olefin-based layer (C) comprises a propylene/a-olefin copolymer, and further comprises at least one of:
(i) a homogeneously branched ethylene/a-olefin copolymer,
(ii) an olefin block copolymer (OBC), or
(iii) a random polypropylene copolymer.

19. The composition of claim 15, wherein the olefin-based layer (C) comprises:
(i) a propylene/a-olefin copolymer; and
(ii) an olefin block copolymer (OBC).

20. An article comprising at least one component formed from the coated substrate according to claim 15.

* * * * *